3,352,892
HYDROLYSIS OF 17-20,20-21-BISMETHYLENE DI-
OXY-STEROIDS OF THE PREGNANE SERIES
Gerlof Vollema, Oss, Netherlands, assignor to Organon
Inc., West Orange, N.J., a corporation of New Jersey
No Drawing. Filed Aug. 22, 1966, Ser. No. 573,814
Claims priority, application Netherlands, Sept. 9, 1965,
65—11,741
4 Claims. (Cl. 260—397.45)

The invention relates to an improved process for the hydrolysis of a 17-20,20-21-bismethylenedioxy-steroid of the pregnane series by means of an acid.

Pregnane compounds with a dihydroxy acetone side chain are very sensitive to all kinds of reagents, such as Lews acids, bases and oxidizing or reducing agents, under the influence of which decomposition or other undesired conversions may occur.

According to the process described in the Netherlands Patent No. 95,768 the dihydroxy acetone side chain can be protected against the influence of such reagents in an effective manner by conversion into the 17-20,20-21-bismethylenedioxy derivative. For that purpose a 17α,21-dihydroxy-20-keto compound of the pregnane series is treated with formaldehyde in the presence of an acid to prepare the desired bismethylene dioxy-steroid. The regeneration of the dihydroxy acetone side chain takes place by treating the thus protected steroid with an acid, for preference a strong organic and/or inorganic acid, such as perchloric acid, formic acid, acetic acid, hydrochloric acid, sulphuric acid or phosphoric acid to recover the original free steroid. The various ways of performing this hydrolysis are described in, i.a., the Netherlands Patent No. 95,769.

The yield of this hydrolysis greatly depends on the nature of the substituents present elsewhere in the steroid molecule, but in many cases does not exceed about 50%. As the introduction, too, of the protecting group does not nearly proceed quantitatively, it is clear that application of this protection in the synthesis of steroids on a manufacturing scale is little attractive.

It has been found now that the yield of the hydrolysis of a 17-20,20-21-bismethylenedioxy-pregnane compound into the corresponding 17α,21-dihydroxy-20-keto-pregnane compound can be raised appreciably, in some cases even by 30% or more, if to the acid reaction medium a compound is added with at least one, possibly etherified or esterified, phenolic hydroxyl group having further no substituents hampering the ortho and/or para substitution relating to the hydroxyl group.

Ortho and/or para substitution is hindered, for instance, if the phenolic hydroxyl compound possesses a substituent in the meta-position relating to the hydroxyl group, which substituent itself promotes meta substitution, such as a nirto, a sulphonic acid or a carboxyl group.

As examples of usable phenolic hydroxyl compounds are mentioned phenol, resorcinol, phloroglucinol, m-chlorophenol, m-cresol, naphthol, anisol, and the monomethylether of resorcinol.

Good results are obtained when use is made of phenol, resorcinol or phloroglucinol.

The phenolic hydroxyl compound is usually applied in a quantity of 1–10 mol per mol, steroid.

By the process of the present invention not only considerably higher yields are obtained, but also a much purer reaction product, the hydrolysis proceeding much quicker as compared with the known process without the addition of a hydroxyl compound according to the invention.

The invention is further illustrated bp the following examples:

Example I

Two grams of 3,11-diketo-17α-20,20-21-bismethylenedioxy-$\Delta^4$-pregnene are dissolved in 80 ml. of acetic acid. After the addition of 6.4 ml. of 70% perchloric acid and 1 gm. of phloroglucinol are stirred for 1 hour in nitrogen atmosphere at room temperature.

After completion of the reaction the precipitate formed is filtered off, after which the filtrate is poured into water and next extracted with chloroform. The chloroform extract is evaporated to dryness in vacuo, after which the thus obtained crude product is re-acetylated with a mixture of 10 ml. of pyridine and 5 ml. of acetic acid anhydride, whereupon the thus obtained cortisone-acetate is isolated by crystallisation.

$C_1$=1.19 gm. of cortisone-acetate; melting point 244–247° C.

$C_2$=0.38 gm.; melting point 215–242° C.

With the performance of the above described process, in which phloroglucinol is replaced by 4 ml. of glycol or omitted, a yield is obtained of 0.84 gm. or 0.89 gm. of cortisone-acetate; melting point 245–248° C. or 238–242° C.

Example II

With the performance of the process according to Example I, in which phloroglucinol has been replaced by 1 gm. of phenol, cortisone-acetate is obtained; melting point 245–248° C. ($C_1$=1.42 gm.).

In the same manner the $\Delta^{1,4}$-3-keto-11β-hydroxy-17α-20,20-21-bismethylenedioxy-pregnadiene, the $\Delta^{1,4}$-3,11-diketo-6α-chloro-17α-20,20-21-bismethylenedioxy-pregnadiene and the $\Delta^{1,4}$-3-keto-9α-fluoro-11β-hydroxy-16α-methyl-17α-20,20-21-bismethylenedioxy-pregnadiene have been converted into prednisolone-acetate, 6α-chloro-prednisone-acetate and dexamethasone-acetate respectively, ing as catalysts resorcinol, m-cresol and α-naphthol respectively.

Example III

A mixture of 1 gm. of 10-vinyl-19-nor-17α-20,20-21-bismethylenedioxy-cortisone, 10 ml. of formic acid and 0.8 gm. of phenol are stirred for 4 hours in nitrogen atmosphere at a temperature of 35° C. After processing the reaction mixture by the process described in Example I 520 mg. of 10-vinyl-19-nor-cortisone-acetate are obtained; melting point 215–219° C.

Using a mixture of acetic acid and perchloric acid as described in Example I and stirring for 4 hours at 20° C. the yield is 68%.

I claim:

1. In a process for the hydrolysis of a 17-20,20-21-bismethylenedioxy-steroid of the pregnane series by treatment with an acid, the improvement which comprises performing said conversion in the presence of a compound having at least one group selected from a phenolic hydroxyl group, an esterified and etherified phenolic hydroxyl group, which compound is further not substituted by a group hampering the ortho and para substitution relating to the relative hydroxyl group.

2. Process according to claim 1, characterized in that as compound is used a compound selected from the group consisting of a benzene and naphthalene derivative having at least one substituent selected from a free, etherified and esterified hydroxyl group.

3. Process according to claim 2, characterized in that the hydrolysis is performed in the presence of a compound selected from the group consisting of phenol, resorcinol and phloroglucinol.

4. Process according to claim 1, characterized in that the phenolic hydroxyl compound is applied in a quantity of at least 1 mol starting from 1 mol steroid.

References Cited

UNITED STATES PATENTS 2,866,799  12/1958  Beyler _____ 260—397.45
3,021,347  2/1962  Allen _____ 260—397.45

ELBERT L. ROBERTS, Primary Examiner.

E. G. LOVE, Assistant Examiner.